United States Patent [19]

Dolezalek et al.

[11] Patent Number: 4,901,254

[45] Date of Patent: Feb. 13, 1990

[54] METHOD AND APPARATUS FOR INFLUENCING THE COLOUR APPEARANCE OF A COLORED AREA IN A PRINTING PROCESS

[75] Inventors: Friedrich Dolezalek, Groebenzell; Karl-Heinz Besson, Munich, both of Fed. Rep. of Germany

[73] Assignee: Fogra Deutsche Forschungsgellschaft fur Druckund, Reproduktionstechnik e.V., Fed. Rep. of Germany

[21] Appl. No.: 73,444

[22] Filed: Jul. 14, 1987

[30] Foreign Application Priority Data

Aug. 5, 1986 [DE] Fed. Rep. of Germany ....... 3626423

[51] Int. Cl.[4] .......................... G01J 3/46; G06F 15/20

[52] U.S. Cl. .................................... 364/526; 356/405; 8/400; 250/226

[58] Field of Search ............... 356/405, 408, 425, 443; 364/526, 470, 496; 8/400; 358/75, 80; 354/20; 250/226

[56] References Cited

U.S. PATENT DOCUMENTS 4,310,248 1/1982 Meredith ............................ 356/425
4,414,635 11/1983 Gast et al. ........................... 356/405
4,623,973 11/1986 Hoffrichter et al. ................ 356/405
4,649,502 3/1987 Keller et al. ......................... 364/526
4,688,178 8/1987 Connelly et al. ................... 364/470
4,706,206 11/1987 Benolt et al. ......................... 364/526
4,717,954 1/1988 Fugita et al. ........................ 356/402

*Primary Examiner*—Parshotam S. Lall
*Assistant Examiner*—Ellis B. Ramirez
*Attorney, Agent, or Firm*—Learman & McCulloch

[57] ABSTRACT

The invention relates to a method and to apparatus for influencing the colour appearance of a coloured area made up of at least three chromatic separation colours in a printing process, on the basis of densitometric or colorimetric measurements, in which the inking is influenced as a matter of priority in at most two chromatic separation colours as a function of the coloured proportion of a sum vector which is determined starting from density value differences or colorimetric difference values in a colour space and broken down into a grey proportion which only affects brightness and a coloured proporation relating to at most two chromatic separation colours. In this way an improved and in particular faster influence on a colour appearance of the coloured area is achieved in a printing process.

14 Claims, 15 Drawing Sheets

METHOD AND APPARATUS FOR INFLUENCING THE COLOUR APPEARANCE OF A COLORED AREA IN A PRINTING PROCESS

THE DRAWINGS

Illustrative subject matter referred to in the following background of the invention, summary of the invention, and detailed description is shown in the drawings in which.

Figures 16A, 16B:
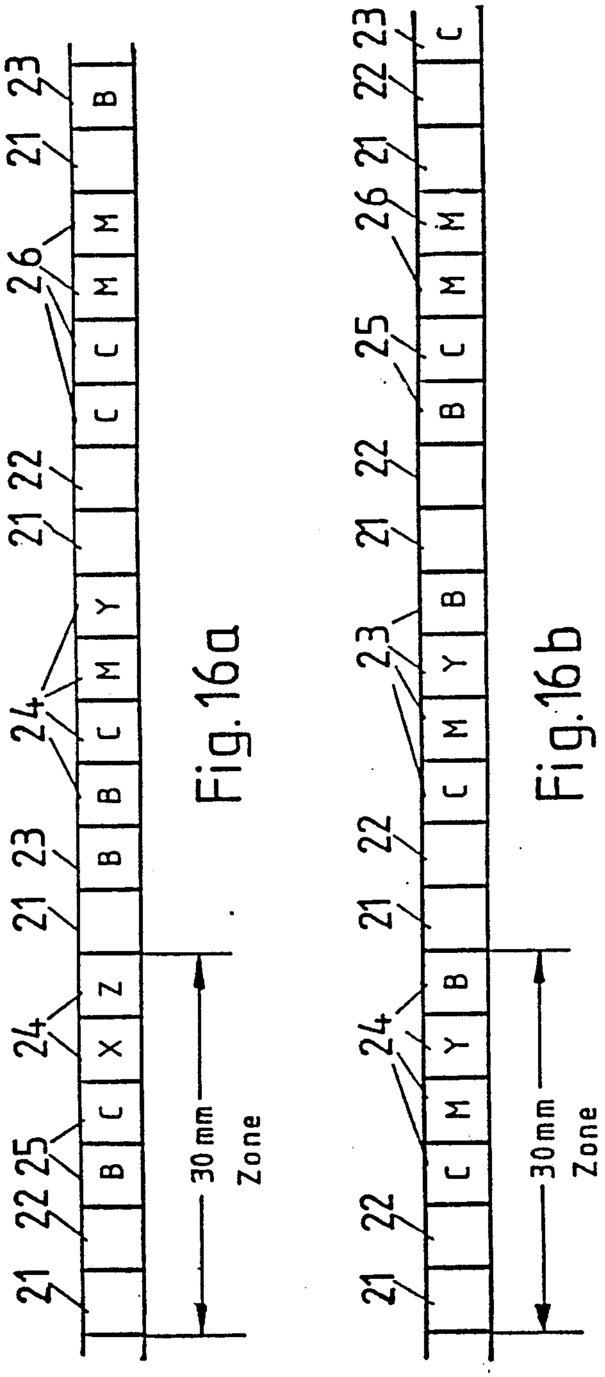

FIGS. 16*a* and 16*b* show two preferred embodiments from which the choice and arrangement of the control patches can be seen.

BACKGROUND OF THE INVENTION

For influencing the colour appearance of coloured areas composed of several separation colours (e.g. cyan, magenta, yellow, black) in a printing process measuring devices are used, predominantly so-called densitometers and more rarely colorimeters (of the "spectral photometer" or "three-filter meter" type). The term "printing process" when used below should be understood to designate all reproduction processes which either produce a printed image on a substrate by means of a printing forme which is inked with an image (e.g. offset printing, gravure, letterpress) or are used as so-called pre-press proof processes as press proof substitutes in reproduction or which are non-impact processes, such as ink-jet printing, transfer thermography, electrophotography and screen printing.

Figure 1:
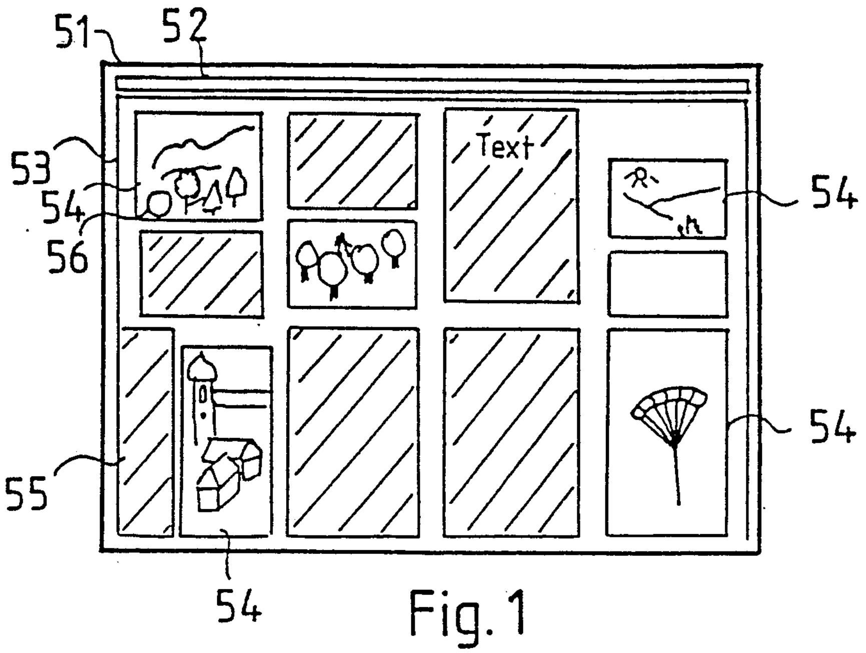
FIGS. 1–3 illustrate respectively a typical printed sheet, actual and target samples, and a colour relationship diagram, referred to in the background of the invention which follows.

The way in which area is divided up in a typical printed sheet 51 which can be produced using the aforementioned processes is sketched in FIG. 1. Outside the end format 53, that is to say in the so-called trimming, there is a print control strip 52 which contains test areas for process control, preferably by densitometric means. The subject located on the total format area of the printed sheet 51 consists here of eight pages of an illustrated work, including both illustations 54 and text 55. A coloured area 56 which is here part of an illustration is emphasised particularly here. This coloured area—there could also be several such areas—is selected on the subject by the printer. It is preferably a matter of a tint in respect of which the printer knows from experience that reproduction of the tint so as to be true to the original can be taken as evidence of the correct reproduction of the remaining tints, or a matter of a particular tint in respect of which the correct reproduction is the deciding factor for the acceptance of the printed product (e.g. skin colour in a cosmetics brochure).

Figure 2:
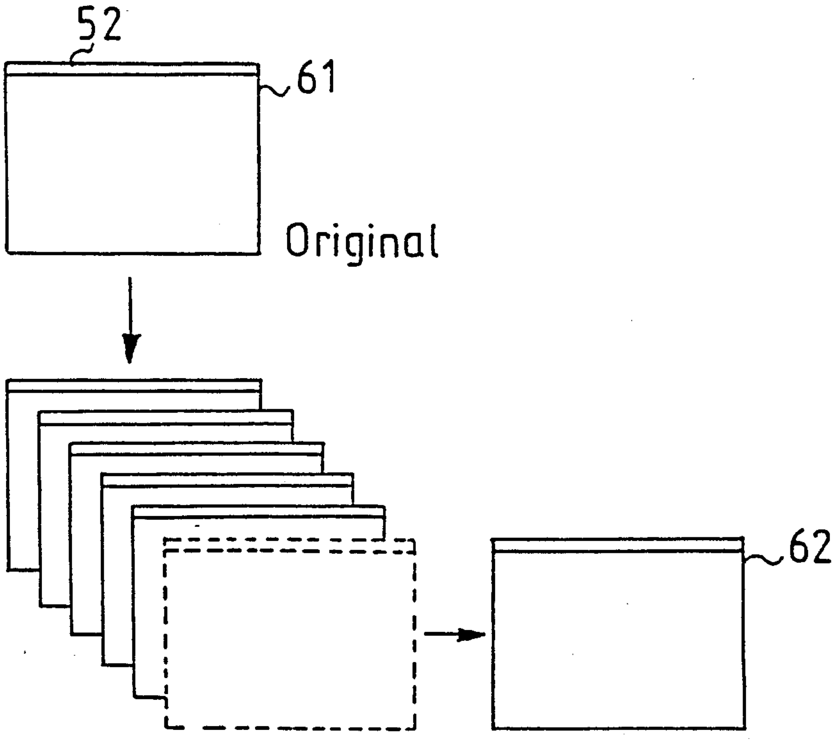

During the printing process the printer periodically examines the printed result, the actual sample 62 (FIG. 2) produced in each case and a target sample 61 which serves as a reference being compared as regards the colour appearance of the coloured area 56 to be influenced, this examination being carried out visually and optionally also using measuring techniques with the aid of the test areas on the print control strip 52. If no target sample is available the comparison is made using target values determined on the basis of past experience. Using the actual values determined on the actual sample 62 and the target samples the differences "actual value minus target value" are formed and understood as a deviation in terms of regulation. In the case of densitometry these are density value differences, and in the case of colorimetry they are colorimetric difference values.

This influencing of the appearance of the colours which is necessary for regulation is carried out by hand by a correction in the inking of the relevant separation colour. "Correction in the inking" is understood to mean an alteration in the quantity of the separation colour applied to an area, irrespective of whether it is an alteration in the effective percent dot area or in the ink thickness.

As an alternative to this, regulating means are known in which any deviation can be converted fully automatically into a setting instruction for correction of the inking of the relevant separation colour. Interruption of the control circuit by the operating staff is both possible and sensible here, since the production process can also be greatly influenced by disruptions which cannot be determined using the chosen test areas. An example of this is the influence deriving from the damping solution in the offset process.

A further example of this is the case in which the test areas used for measuring differ very greatly from the corresponding values of the coloured area to be influenced as regards the percent dot area of the separation colours. Here, strictly speaking, the known regulating method only ensures that the appearance of the colours in the test area remains constant; this does not always necessarily apply to the coloured area to be influenced. For instance, in offset printing when measurement is carried out in solid control patches of a print control strip the appearance of the colours in these control patches can indeed be kept constant; however, this does not necessarily also apply to the appearance of the colours of a light tone. The latter in fact depends not only upon the ink thickness which can be controlled by the solid control patches but also to a large extend upon production-contingent fluctuations in the percent dot area in the light tone range.

It is the purpose of automatic regulation or operator control either to copy the inking in an available target sample as accurately as possible with the aid of the density values measured there for example on test areas or to achieve an inking which is characterised by a set of previously determined target density values. In this way in printing processes which are directed towards the production of a few samples (example: pre-press proof process) a large degree of colour corrdespondence with the copy is achieved, and in printing processes for large runs (e.g. offset printing, gravure, letterpress and screen printing) it results in the limitation of the production-contingent fluctuations within a run.

One disadvantage of the known influencing methods is that the separation colours participating in the image sysnthesis are adjusted independently of one another. This can lead to the colour appearance perceived by an observer and in particular the hue of a coloured area considered critical for the acceptance of the product being drastically altered because the accurate grading of the quantities of separation colours applied which is necessary in order to arrive at this hue are not taken into account during the regulation process. If the aggregates of the separation colours applied differ as regards their regulation action the regulating process can even lead temporarily to an increase in the hue deviations, although the individual density deviations of the separation colours are all reduced.

One shortcoming of the knwon densitometers for control or regulation is that the density values or deviations therefrom which they display do not allow any conclusions as to the actual colour distances of a coloured area 56 in a subjectively equidistant colour space and in partiular do not facilitate any distinction between deviations which merely relate to brightness and those which also relate to hue and saturation.

Sufficiently reliable data on colour distances and on the colorimetric co-ordinates of hue, colour saturation and brightness can only be obtained according to the prior art by using colorimeters. However, by comparison with densitometry these devices necessitate high technical expenditure. Their use for control or regulation of the colour appearance of four-colour images is restricted because it is not generally possible to break down a measured total colour shift into the individual contributions to the image synthesis of the participating separation colours. Thus the display does not reveal whether for example a displayed alteration in brightness is based on similar alterations in the inking in the case of all chromatic separation colours or whether it is only attributable to the separation colour black. First of all the colorimetric representations which are helpful for the understanding of the later description are explained below.

Figure 3:
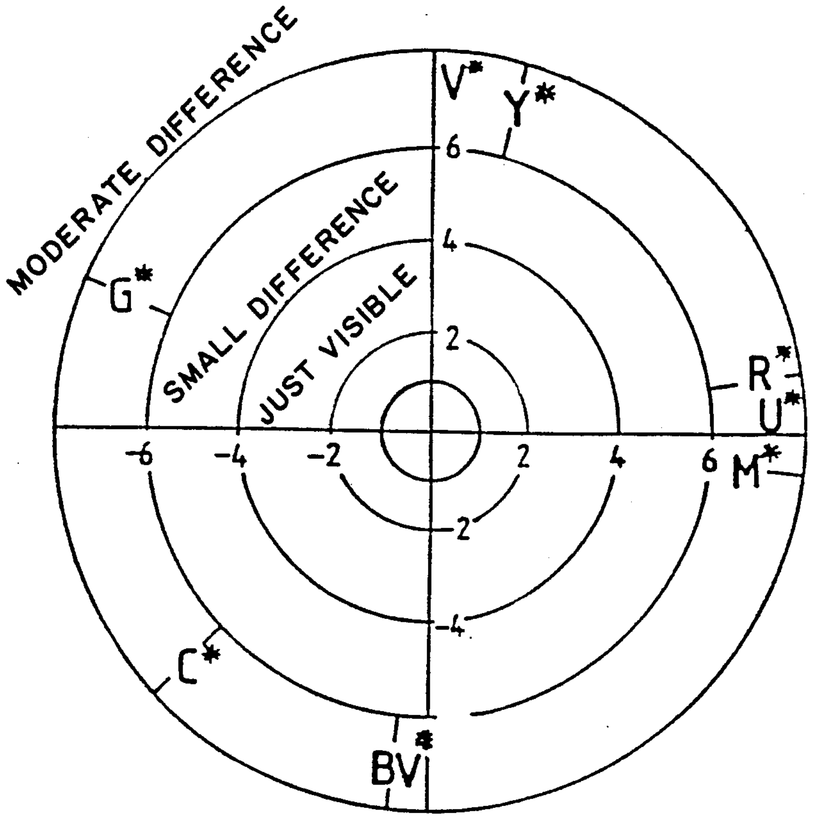

The U*-V* diagram belonging to the approximately subjectively equidistant colour space according to CIE-UCS-1964 is shown as an example in FIG. 3. It deals with a rectangular Cartesian system of co-ordinates with linear axes graduated on the same scale for the colorimetric co-ordinates U* and V*. The co-ordinate W* is plotted on an axis which is at right angles thereto and describes the brightness. All colours of the same hue lie on the same radius going out from the source in the U*-V* plane. The colour saturation increases as the distance from the source increases. In polar co-ordinate representation the polar angle here designates the hue and the radius the saturation, the pole represents the neutral grey or white hue, also called the achromatic point. Therefore both the circular lines of equal saturation and also the polar angles of the chromatic separation colours (here cyan C*, magenta M*, yellow Y*) and their mixed colours of the first order (here red R*, green G*, blue-violet BV*)—taken from the data in DIN 16539 "European colour scale for offset printing-"—are plotted in FIG. 3. One scale unit in the CIE-UCS-1964 system corresponds to a difference in the colour appearance which is just visible under optimum conditions, two units are perceived as a just visible difference and four units as a slight difference.

In order also to be able to represent small colour shifts of such colours which are further removed from the achromatic point U*=0, V*=0, it is recommended to transfer the source of the representation according to FIG. 3 to the target colour co-ordinates of the reference sample 61 and designate the axes ΔU* and ΔV* (FIGS. 4–9). In this representation the circular lines no longer designate equal colour saturation and the association of the polar angles with specific hues is in any case again given approximately. However, there remains the interpretation of the distance of the actual target co-ordinates from the source as the colour distance and the significance of the polar angle as a direction indicator for a colour shift. The direction can be seen for each fully saturated chromatic separation colour from a colour atlas graduated according to CIE-USC-1964. However, for colours which are not located too far from the achromatic point the directions shown in FIG. 3 apply at least approximately.

SUMMARY OF THE INVENTION

The invention takes as its starting point methods of influencing the colour appearance of a coloured area made up of at least three chromatic separation colours in a printing process on the basis of densitometric or colorimetric measurements in at least one test area in which the differences between actual and predetermined values are determined and used to influence the inking of the separation colours. Its object is to provide such a method in which the shortcomings of the prior art which have been referred to are avoided and an improved and in particular quicker means of influencing the colour appearance of the coloured area in a printing process is achieved.

Advantageous embodiments of the invention are explained in greater detail below in connection with the description of several examples.

DETAILED DESCRIPTION

Figure 4:
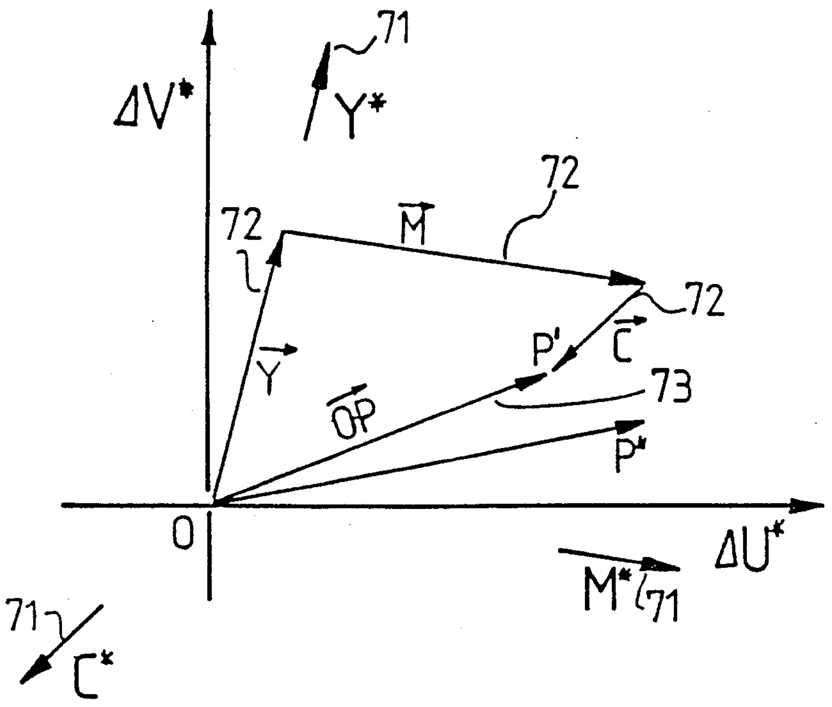
FIG. 4 is a diagram referred to in the summary of the invention, used in explaining the way the invention is achieved with the aid of a special embodiment with densitometric determination of density valve difference.

The way in which the object is achieved according to the invention will be explained first of all with the aid of a special embodiment with densitometric determination of the density value differences. For this a vectorial auxiliary construction is used which will be described in greater detail with the aid of FIG. 4 before the actual example is set out. FIG. 4 shows a plane of equal brightness of the CIE-UCS-1964 colour space. The axes U* and V* known from FIG. 3 were shifted parallel so that the (for the moment unknown) target colour co-ordinates of the coloured area 56 which is to be influenced as regards its colour appearance now lie in the source 0. Arrows indicate the separation colour directions 71 C*, M* and Y* which in this case coincide with the directions which show from the achromatic point to the colour co-ordinates of the fully saturated separation colours. This choice is obvious because in this example the colour appearance of a coloured area which is neutral grey and therefore lies in the achromatic point is to be influenced.

After the actual sample has been measured the density value differences of the separation colours are determined; the separation colour black is regulated separately according to the prior art. The density value difference of each chromatic separation colour is detected after multiplication by a scale factor (to be explained later with the aid of Table 1) as absolute amount (length) of a separation colour vector 72 the direction of which coincides with the appertaining separation colour direction 71. The vectorial addition of the separation colour vectors 72 points from the source O to the point P'; the vector $\overrightarrow{OP}$ is designated as sum vector 73. The point P' is the actual colour co-ordinates approximated by means of vectorial auxiliary construction. By measuring with a colorimeter the actual colour co-ordinates are obtained directly, designated here by P''.

After explanation of the vectorial auxiliary construction the embodiment of the invention referred to above will now be described.

On a four colour offset press a printed product is produced, the pictures of which are produced by four-colour overprinting with suitably graded inking in the basic colours black, cyan, magenta and yellow. For the purpose of controlling and regulating the printing and in particular the colour appearance of a neutral grey colured area control patches with 80% dot area are also provided on the four printing formes as part areas for the purpose of densitometric measurement. After a target sample has been produced by testing which is acceptable as regards the colour appearance of a nominally grey coloured area with a three colour mix, the densitometer is reset on the control fields of the target sample in all four colours, so that the density values are stored as target values. During further production actual samples are taken at regular intervals and measured; suppose the indicated acutal values of such an actual sample are black 0.1, cyan −0.14, magenta 0.17 and yellow −0.20. While the density deviation of black is controlled separately, the actual values of cyan, magenta and yellow are multiplied by the scale factors 51, 40.5 and 39 and plotted in a diagram according to FIG. 3 but with the axis designations $\Delta U^*$ and $\Delta V^*$ in the separation colour directions of cyan, magenta and yellow as separation colour vectors $\vec{C}$, $\vec{M}$, $\vec{Y}$ going out from the zero point.

Figure 5:
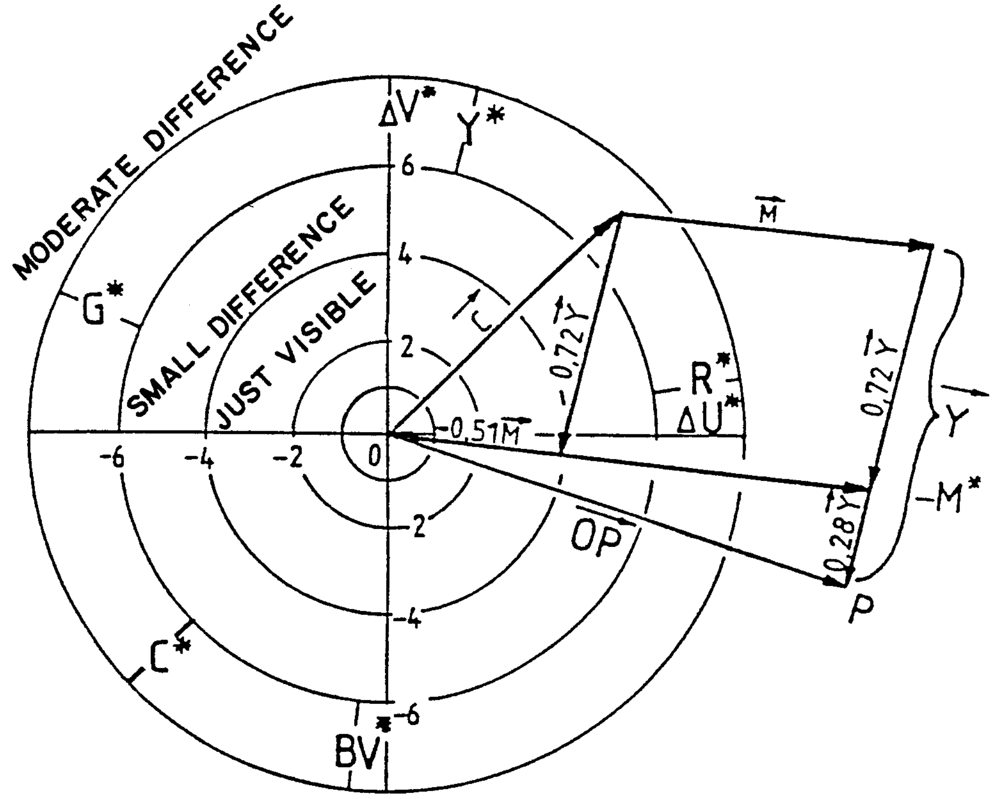
FIG. 5 is a plotting of vectors in a base diagram similar to that of FIG. 3.

The vectors $\vec{C}$, $\vec{M}$, $\vec{Y}$ and their additon, the sum vector $\overrightarrow{OP}$ which points from the source to the point P, are plotted in FIG. 5. With the chosen scale factors the following applies: the absolute amount of the sum vector $\overrightarrow{OP}$ at 10.5 units indicates the approximate colour distance of the actual sample from the target sample without taking account of the brightness for a grey tint composes of cyan, magenta and yellow (here designated as a shadow balance) with the percent dot areas C 72%, M 59%, Y 55% in the half-tone positive field in subjective units ΔE CIE-UCS-1964. The polar angle 342° designates the approximate direction of the colour shift which has occurred—here towards red violet.

The colour shift indicated by the sum vector $\overrightarrow{OP}$ is broken down according to the invention into a grey proportation which only affects brightness and a coloured proportion which relates predominantly to hue and saturation, which is chosen here so that it only relates to magenta and yellow.

$$\underbrace{OP = (C - 0.51\,M + 0.72\,Y) +}_{\text{grey proportion}} \quad \underbrace{1.51\,M + 0.28}_{\text{coloured proportion}}$$

The coefficients of the vectors $\vec{M}$ and $\vec{Y}$ contained in parentheses are chosen so that the analysis of the parentheses carried out geometrically in accordance with FIG. 5 leads back to the source O, i.e. zero.

After reconversion into colour density differences (e.g. by dividing the absolute amounts of the individual vectors by the respective scale factors) the proportions can be used according to different strategies for controlling the press. For example, it might be decided initially not to balance out the density value differences corresponding to the grey proportion but first by appropriate ink fountain setting to carry our the corrections in the inking which relate empirically to the density value differences 0.26 for magenta and −0.06 for yellow. After this relatively minor intervention into the ink flows of the magenta and yellow printing units the original colour appearance of the nominally grey coloured area is restored to a perceptible but less distrubing brightness deviation.

By breaking down the sum vector $\overrightarrow{OP}$ into a three-component grey proportion which only affects brightness and a two-component coloured proportion for the purpose of separate balancing out, in this example after carrying out the corrections "M: minus 0.26 density, Y: plus 0.06 density" an acceptable colour appearance of the coloured area is already achieved which after carrying out a second control step "C: plus 0.14 density; M: plus 0.09 density; Y: plus 0.14 density" is fully returned to the starting point.

In the known regulating processes according to the prior art the density value differences which occur are simultaneously balanced out or regulated indiscriminately, so that in the example a conrol excursion accumulated according to absolute amounts of $$0.14+0.17+0.20=0.51$$

would have to be tackled, whereas in the separate balancing out according to the invention accumulated control excursions of $$0.14+0.09+0.14=0.37$$

occur for the grey proportion and $$0.26+0.06=0.32$$

for the coloured proportion. In total this results in a slight increase in the control resources to $$0.37+0.32=0.69$$

compared with 0.51 in the prior art. However, for this the hue and the saturation of the starting sample is achieved with a control excursion of 0.32, which reduces the rejects resulting from colour cast.

Whereas the preceding embodiment demonstrated how to achieve the object according to the ivention in a specific case, it will be shown below how the object can be achieved in the general case. For the sake of clarity it will be assumed from the outset that the process to be controlled or regulated is half-tone printing and that the coloured area to be influenced is an approximately grey shadow area, referred to here as shadow balance, which is produced by overprinting suitably graded percent dot areas of cyan, magenta, yellow and possibly also black, and also that in each case test areas printed with only one separation colour—for instance assembled in one print control strip—are available for densitometric measurement. Generalisations on other coloured areas and separation colours and particularly more than three chromatic separation colours and other printing processes and the measurement in non-monochrome test areas are then dealt with. First of all the density values for the cyan, magenta and yellow test areas are determined as target values with the densitometer set on the respective colour; the density value of the black area is also measured. The percent dot area of the film copies appertaining to the test areas should be chosen in the half-tone positive in the range of 40% to 80%, and the combination of cyan 75%, magenta 62% and yellow 60% belonging to a shadow balance and other similar gradations are preferred because under normal printing conditions in offset printing with triple overprint an approximately neutral, grey dark hue is produced which reacts very sensitively to the slightest fluctuations in the inking in one or more of the participating separation colours. Therefore a signal function is ascribed to such test areas; in the event of fluctuations in the printing process the alterations in the colour co-ordinates which can be measured there colorimetrically are always greater than in all the other coloured areas which are also composed of three chromatic separation colours and have the same or a greater degree of brightness.

Instead of measured target values it is also possible to use those which have proved advantageous with the same test areas in preceding production processes.

During production a proof sample is taken and the actual values for the density are determined. Whilst the density value difference for black is not processed further, the density value differences "actual value minus target value" of the chromatic separation colours are interpreted after multiplication by scale factors as absolute amounts of separation colour vectors 72 which here point from the source of a subjectively equidistant colour space in each case approximately in the region of the colour co-ordinates of the appertaining solid tone. In the general case they point from the colour co-ordinates of the coloured area to be influenced approximately to the target colour co-ordinates of the fully saturated separation colour.

In the case of the colour space it is preferably a matter of the CIE-UCS-1964 system or the CIE-LUV system. The most favourable separation colour directions for the method according to the invention (possibly deviating somewhat in the individual case from the fully saturated separation colours) and the most favourable scale factors can be determined by the following process and sensible variants thereof: A coloured area which is constructed as a shadow balance is subjected to the printing process during which the inking of the chromatic separation colours is systematically varied. Thereupon a colorimeter is used to measure the colour co-ordinates of the balance, the full tones of the chromatic basic colours and those of their mixtures of the first order in several samples which deviate in a typical manner. The values of a target sample with an almost ideal grey shadow balance are used as target values and subtracted from the corresponding values for the actual samples; the result is plotted in an equal brightness plane of the selected colour space.

Figure 6:
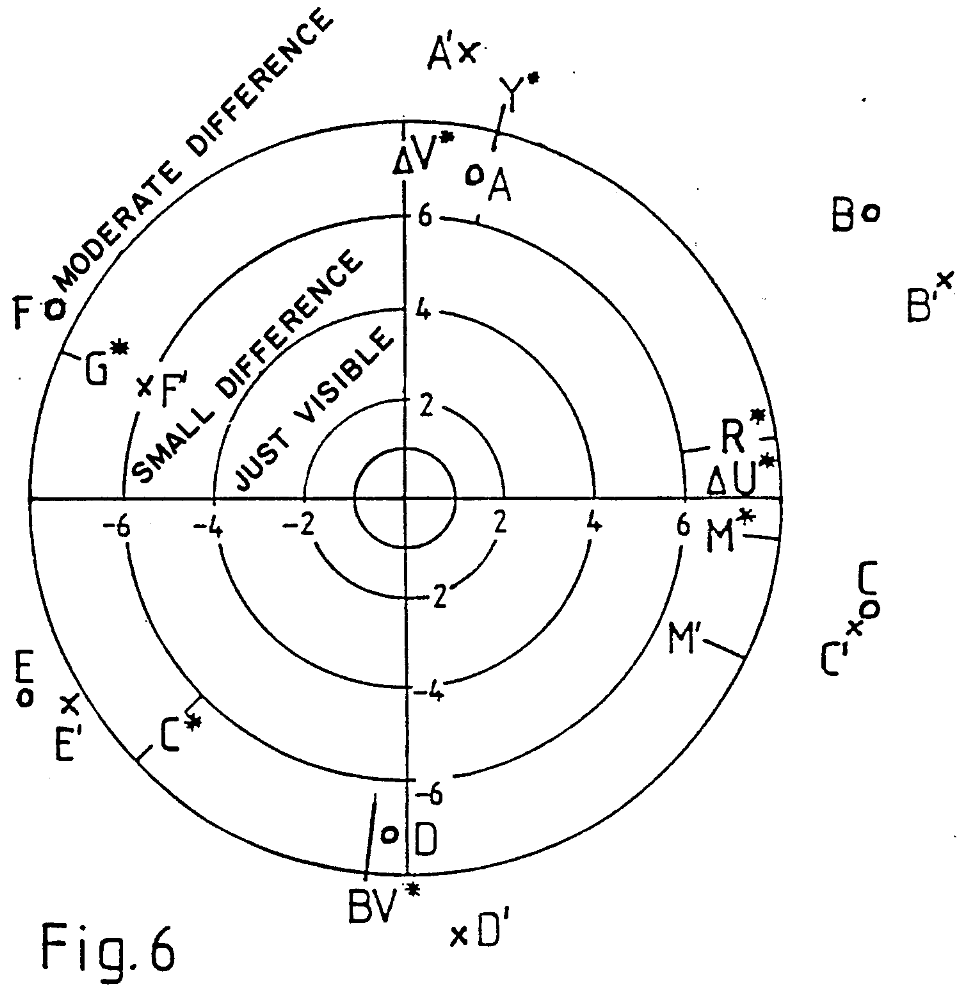
FIG. 6 shows the results of a test run plotted in a diagram modeled on that of FIG. 5.

FIG. 6 shows the result of such a test run in a diagram modelled on FIG. 5 in which the target colour co-ordinates of the almost ideal grey target sample lie in the source. The target colour co-ordinates of the basic and mixed colours lie for outside the diagram and are here marked simply as separation colour directions. However, for the construction the separation colour direction M' is used instead of the direction M*. The end points A' to F' of the sum vectors are plotted in this diagram on the basis of the density value differences for cyan, magenta and yellow determined with a densitometer. By multiple testing it was previously established that the scale factors and separation colour directions set out in Table 1 resulted in the best approximation of the densitometric auxiliary construction to the colorimetrically measured colour co-ordinates (A to F in FIG. 6 of the shadow balance coloured area to be influenced here.

TABLE 1

| Percent dot areas of the | Scale factors | | | Polar angles of the separation colour vectors | | |
|---|---|---|---|---|---|---|
| test areas | C | M | Y | C | M' | Y |
| C 40 M 40 Y 40 | 0.72 × 271 | 0.57 × 271 | 0.55 × 271 | 223° | 335° | 75° |
| C 72 M 57 Y 55 | 0.72 × 117 | 0.57 × 117 | 0.55 × 117 | 223° | 335° | 75° |
| C 80 M 80 Y 80 | 0.72 × 71 | 0.57 × 71 | 0.55 × 71 | 223° | 335° | 75° |
| all 100% | 0.72 × 58 | 0.57 × 58 | 0.55 × 58 | 223° | 335° | 75° |

Figure 7:
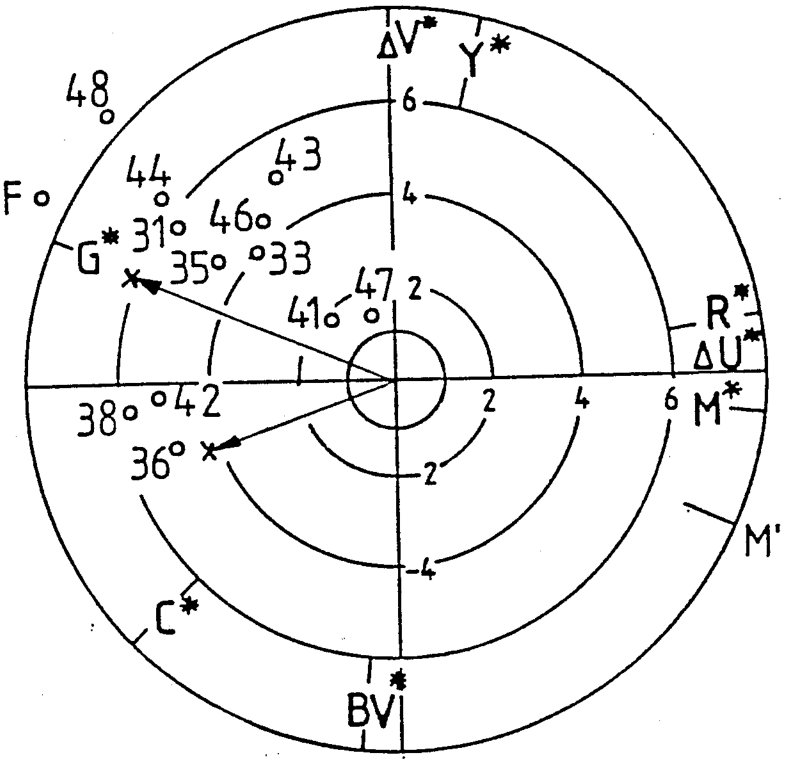
FIG. 7 is a plotting of directly measured colour measurements.
Figure 8:
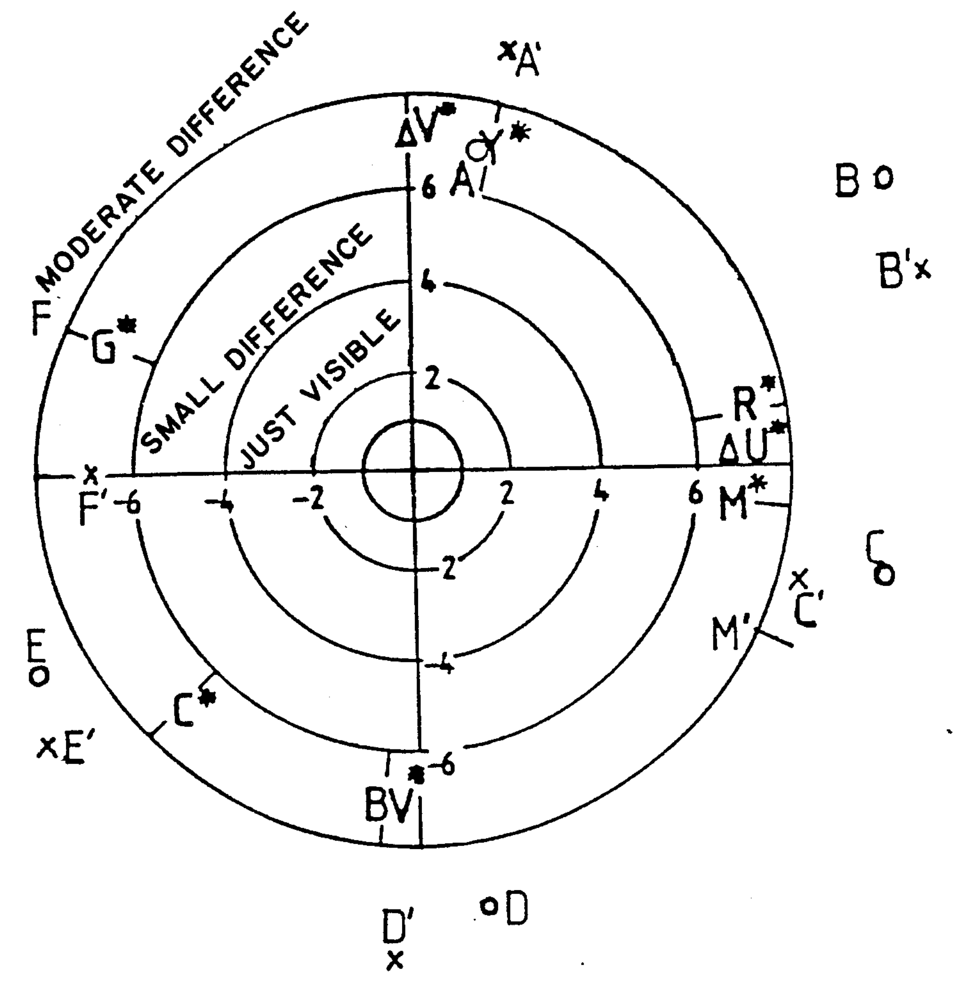
FIGS. 8 and 9 are plottings reflecting measured density values combined vectorially.
Figure 9:
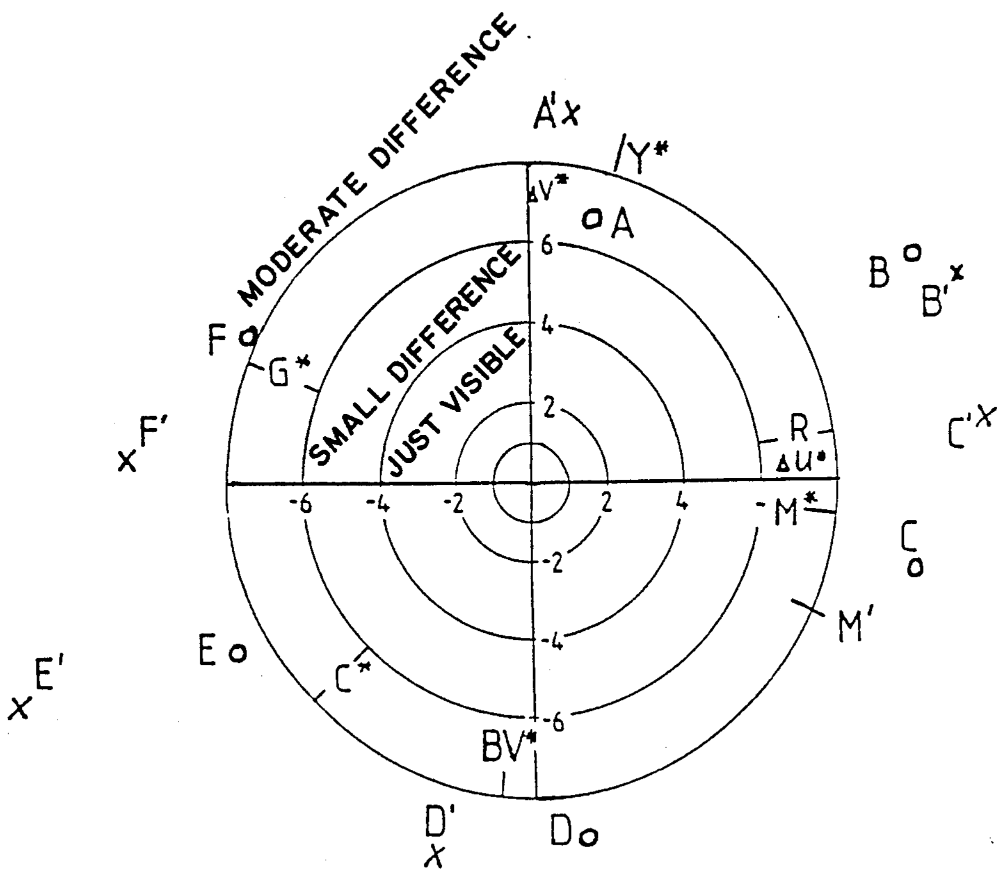

The quality of the approximation was judged on the basis of the mean quadratic deviations in the case of polar angle and distance, resulting in values between 9° and 18° or 2.2 to 3.8 units ΔE (CIE-UCS-1964). This confirmed the assumption that the approximation is most accurate when measurements are carried out in test areas in which the percent dot area comes closest to that of the coloured area to be influenced as regards its colour appearance. The scale factors of Table 1 are represented as products of the percent dot area of the respective separation colour in the coloured area to be influenced as regards colour and of a calibration factor (f) which is the same for all chromatic separation colours. In the event that the latter cannot be directly determined empirically, the following formula serves as a satisfactory approximation:

$$f = 80 \times D^{-1.1} \quad \text{(Equation 1)}$$

where D is the mean of the colour densities of the chromatic separation colours measured in the test area or areas. The percent dot area factor takes account of the fact that a measured alteration in the inking of a separation colour can certainly only be effective in so far as it is represented in proportion to the area in the relevant coloured area. Therefore the same production fluctuations work out lower by a factor of 2 to 3 in a middle tone balance coloured area with C 28 M 21 Y 19 than in a shadow balance with C 72 M 57 Y 55, which corresponds to approximately 2.5 times higher percent dot area. The same also applies to other coloured areas composed of a plurality of colours, including those which lie further away from the grey axis, so long as they are not darker than the shadow balance. In FIG. 7 are plotted the colour deviations measured directly with a colorimeter of 12 different coloured areas and a shadow balance which resulted from the comparison of two samples from the test run on which FIG. 6 is based. The coloured areas 31–48 are chosen according to DIN 6169, F is the colour co-ordinates of the shadow balance. The colour co-ordinates of the target sample lie in the source, but only the colorimetric difference values are shown; the absolute amount of the shift is at maximum here. This observation was also made in the other actual samples evaluated for FIG. 6. The deviation of the shadow balance coloured area can therefore be designated as the upper limit for the corresponding values of all other coloured areas according to the absolute amount, so long as the coloured areas are not darker than this balance coloured area. The polar angle of the deviation also applies to most other coloured areas. Those coloured areas which predominantly contain only proportions of two chromatic separation colours or also the separation colours themselves constitute an exception here. In FIG. 7 the coloured areas 36, 38 and 42 break out of the direction trend. However, there shift direction can also be determined according to the vectorial auxiliary construction according to the invention from density value differences if it is borne in mind that one of the three scale factors must disappear since the related percent dot area is zero. The application of the scale factors calculated with the percent dot areas of the coloured area 36 C 0.55; M 0.39; Y 0.00 results after addition of the vecotrs in the point P' which approximates the deviation of the coloured area 36 with a satisfactory degree of accuracy.

From the scale factors in Table 1 it can be seen that in order to achieve an accuracy of ±2 units ΔE CIE in densitometric measurement, measurements must be accurate for example to ±0.01 for cyan in the 40% control patch, to ±0.02 in the shadow balance control patch, to ±0.04 in the 80% control patch and at least to ±0.05 in the solid tone patch. If it si also taken into account that the values of the separation colours fluctuate independently of one another, then the quoted tolerances are halved. During separate control or regulation for a neutral grey proportion and a coloured proportion it is sensible not only to take account of the subjective colour distances in the plane of equal brightness of the colour space (e.g. U*-V* plane in the CIE-UCS-1964 system) but also to know differences in the subjectively evaluated brightness (e.g. W* in the CIE-UCS-1964 system).

When measurement was carried out on monochrome control patches with a percent dot area of 80% on the film with a densitometer set to the separation colour black it was found that the density values of the fields for the separation colours cyan, magenta and yellow come out at 1:1.43:0.14. The approximation derived empirically therefrom for the brightness of a shadow balance coloured area with the percent dot areas C 72, M 57, Y 55 for the CIE-UCS-1964 system is $$\Delta W^* = -0.72 \cdot 14 \Delta D_C - 0.57 \cdot 25.5 \Delta D_M - 0.55 \cdot 2.6 \Delta D_Y \quad \text{(Equation 2)}$$

where ΔW* represents the deviation of the brightness W* based on alterations in the inking of cyan, magenta and yellow, determined via the density value deviations $\Delta D_C$, $\Delta D_M$ and $\Delta D_Y$ in the appertaining monochrome 80% control patches.

A comparison of this approximation with the colorimetry in the print trial on which FIG. 6 is based resulted in a mean quadratic error of 0.4 units ΔE for W*; the value of W* moved in the trial between 36.0 and 42.5.

Although the given approximation only applies to the brightness of a shadow balance coloured area and for measurement in the said control patches, densitometry and colorimetry can be used in the same way on trial prints with other control patches and other coloured areas to be assessed as to their brightness in order to find the appropriate scale factors therefor. Equally, the alteration in brightness caused by a fluctuation in the inking of the separation colour black, for example from the colorimetric definition equation for the co-ordinate W*

$$W^* = 25 \cdot Y^{\frac{1}{3}} - 17 \quad \text{(Equation 3)}$$

with $$Y = 100 \cdot 10^{-DB} \quad \text{(Equation 4)}$$

can be given as follows:

$$\Delta W^* = -89 \cdot 10^{-DB/3} \Delta D_B \quad \text{(Equation 5)}$$

Here $D_B$ is the density value for black measured on a black control patch and $\Delta D_B$ is the alteration thereof.

The breakdown of the sum vector $$\vec{OP} = \vec{C} + \vec{M} + \vec{Y} \quad \text{(Equation 6)}$$

into a colour-neutral grey proportion only affecting brightness and a coloured proportion expressed by at most two chromatic separation colours can generally be expressed as follows:

$$\lambda\vec{C} + \mu\vec{M} + \nu\vec{Y}) + (1-\lambda)\cdot\vec{C} + (1-\mu)\vec{M} + (1-\nu)\vec{Y} \quad \text{(Equation 7)}$$

The number triple (λ,μ,ν) is chosen so that in each case one of the coefficients λ, μ, ν is equal to 1 and in addition $$(\lambda\vec{C} + \mu\vec{M} + \nu\vec{Y}) = 0 \quad \text{(Equation 8)}$$

The symbol on the right designates the zero vector. Since three coplanar vectors are always linearly dependent, the coefficient triple can be determined at once. In the general case at most three different breakdowns are produced, but on the other hand there are two breakdowns if $\vec{OP}$ is colinear with $\vec{C}$, $\vec{M}$ or $\vec{Y}$ and only one breakdown if $\vec{OP}$ is the zero vector.

The control or regulation can be carried out according to either of the breakdowns thus found. For example it may be decided that no intervention is to made at the moment in the inking of magenta on an offset press because the ink/water balance is considered critical here. Instead the deviation is corrected via cyan and yellow; deviations in brightness are accepted. In other cases the choice can be made according to one or more of the following criteria;

1. Minimising the setting path of the coloured proportion $$|(1-\lambda)\vec{C}| + |(1-\mu)\vec{M}| + |(1-\nu)\vec{Y}| = \text{min.} \quad \text{(Equation 9)}$$

2. Minimising the overall setting path $$|\lambda\vec{C}|+|\mu\vec{M}|+|\nu\vec{Y}|+|(1-\lambda)\vec{C}|+|(1-\mu)\vec{M}|+|(1-\nu)\vec{Y}|=\text{min.} \qquad \text{(Equation 10)}$$

3. Minimising the brightness difference according to the balancing out or regulation of the coloured proportion, e.g. for the CIE-UCS-1964 system $$\Delta W^*(\lambda\vec{C}+\mu\vec{M}+\nu\vec{Y})=\text{min.} \qquad \text{(Equation 11)}$$

where the function $\Delta W^*(x)$ is determined according to equation (2) or corresponding approximations.

4. The coloured proportion is composed of the two separation colour vectors between which the sum vector $\vec{OP}$ lies. For example in FIG. 5 $\vec{OP}$ lies between the directions "plus $\vec{M}$" and "minus $\vec{Y}$"; the coloured proportion composed of "plus $\vec{M}$" and "minus $\vec{Y}$" demonstrably fulfils criterion 1 geometrically. The choice of vectors of the coloured proportion can therefore also be made according to polar angle ranges for $\vec{OP}$.

The means for achieving the object according to the invention are set out above for the general case but are limited for the sake of clarity to the control or regulation of the colour appearance of a shadow balance coloured area to be produced in half-tone printing and to be influenced as regards its colour appearance with the aid of densitometric measurements on test patches which are each printed with only one separation colour. The application of this teaching toi any coloured areas to be influenced and any test patches is already marked out by the splitting up of the scale factors in Table 1 into the percent dot area on the film copy or the printing forme of the coloured area and the calibration factor f which is based upon the test patch and dependent upon the colour density. The application to those screenless printing processes, such as for example gravure after offset/gravure conversion, in which the starting point is a screened copy, is also possible without more ado. For those screenless printing processes in which unscreened copies are used for platemaking the percent dot area is replaced by the following mathematical value:

$$\phi=\frac{1-10^{-D}}{1-10^{-D_{max}}} \qquad \text{(Equation 12)}$$

where D is the optical density (transmitted light or reflected light) of the coloured area to be influenced on the film copy and $D_{max}$ is the density of the copy which leads to the maximum application of colour in the printing process. In any case a print trial with systematic variation of the inking of the separation colours and subsequent analysis by densitometer and colorimeter can be used according to the methods described above in order to check and possibly improve the correct choice of scale factors and separation colour directions in order to create the preconditions for the application of the control or regulating method according to the invention.

The way in which the object of the invention is achieved is not bound to the separation colours cyan, magenta and yellow which have been particularly emphasised above; on the contraray, any chromatic separation colours of which at least three are not the same hue are used for the image syntheses. If there are more than three separation colours of different hue there are any number of different breakdowns into a grey proportion and a coloured proportion. However, these are reduced to a few as soon as the coloured proportion is composed according to the invention of at most two chromatic separation colours. By analogy with the control or regulation of the production print, the method according to the invention can also be applied to the production of pre-press proofs or press proofs (according to a model as target sample or according to target density values), to the setting-up process in the preparation of the production print according to an available press proof as target sample, a pre-press proof or a previous production print and finally to other printing process operating in a comparable manner such as for example ink-jet printing, transfer thermography, electrophotography and screen printing, so long as the image synthesis is achieved by at least three chromatic colours (of differing hue) which can be influenced as regards inking.

Whereas in the previously described examples the inking is controlled in monochrome screened test patches, in the following Examples A to E the object of the invention is achieved by densitometric measurement on monochrome solid tone patches in offset printing, on three-colour over-printed half-tone patches, by densitometric formation of mean values from the subject and by colorimetry. Then preferred embodiments are set out in Examples 1 to 3 with which the method according to the invention can be carried out particularly favorably.

EXAMPLE A

During an offset print trial the colour appearance of a shadow balance coloured area was monitored with the aid of densitometry in solid tone test patches. The mean density values were 1.75 for cyan, 1.66 for magenta and 1.26 for yellow, thus the mean over all the separation colours was 1.56. Thus the calibration factor f according to equation (1) is $$f=80\times1.56^{-1.1}=49$$

This results in the following scale factors by analogy with Table 1 for a shadow balance:

C 0.72·49 M 0.57·49 Y 0.55·49

By systematic variation of the solid tone densities of the chromatic separation colours six inkings were set which deviated markedly from the initial setting of the target sample. The measured density value differences from the respective target value were multiplied by the respective scale factor and then plotted in the separation colour directions C*, M′ and Y* of FIG. 8 starting from the source and then combined vectorially, resulting in the A′ to F′. The points A to F were measured with a colorimeter directly in the shadow balance coloured area. In spite of mean quadratic errors of 13° in the polar angle and 2.6 ΔE units in the colour distance the vectorial auxiliary construction is sufficient to enable the division of the sum vector according to the invention into a grey proportion and a coloured proportion composed of two separation colours to be carried out sensibly. A preferred composition of the coloured proportion (according to criterion 4) is produced from the two separation colour directions $\vec{C}^*$, $\vec{M}'$ and $\vec{Y}^*$ flanking the respective point, and these should also be though of as being extended through the source. Thus point A′ is represented through $\vec{Y}$ and minus $\vec{M}'$, point B′ through minus $\vec{C}$ and $\vec{M}$, point $\vec{C}'$ through $\vec{M}'$ and minus $\vec{C}'$ etc.

The further processing of the deviation using regulating techniques has already been described.

EXAMPLE B

In production printing there is often insufficient space on the printing forme for monochrome control patches. Moreover, these control patches have the disadvantage that disruptions in the overprinting of the separation colours—such as for example poor ink trapping—are not perceptible. Ideally in offset printing in each printing area of 30 mm to 40 mm width the density values should be checked in the middle tone, shadow tone and solid tone in at least four but preferably six separation colours and these should be further processed for control or regulation. However, this is not possible with a space required of 5×5 mm.

It will be set out below how the control and regulating method according to the invention can be carried out when measurements can only be made using control patches with a plurality of colours overprinted as test patches. For the application of this method a print control strip is provided which contains at least one shadow balance control patch in each area and also has for example solid tone patches for four to six colours (see example 3).

During production the density values of cyan, magenta and yellow are measured with a densitometer in each shadow balance control field of an actual sample and and compared with those of a target sample or with target values from a preceding production. From the density value differences obtained $$\Delta D_{C}', \Delta D_{M}', \Delta D_{Y}'$$

the appertaining density value differences unmodified by prime are calculated $$\Delta D_{C}, \Delta D_{M}, \Delta D_{Y}$$

which have resulted by approximation in monochrome printing. The following serves for this:

$$\Delta D_C' = \Delta D_C + a_{12}\Delta D_M + a_{13}\Delta D_Y \qquad \text{(Equation 13)}$$

$$\Delta D_M' = a_{21}\Delta D_C + \Delta D_M + a_{23}\Delta D_Y$$

$$\Delta D_Y' = a_{31}\Delta D_C + a_{32}\Delta D_M + \Delta D_Y$$

In order to determine for example the coefficent $\alpha_{12}\alpha$ densitometer set to cyan is used to measure the magenta of the shadow balance control patch in a single print which is to be prepared just for this purpose and the density value obtained is divided by the one obtained by resetting to magenta. This applies by analogy to the other coefficients. Then the system of equations are solved using Kramer's rule according to the density value differences which are not modified by prime.

As an example of the application of balance control patches and the usefulness of the method of approximation the samples on which the print trial of FIG. 6 is based were measured directly in a shadow balance control patch by densitometry. Then using the previously determined coefficient matrix $||a_{nm}||$ $$||a_{nm}|| = \begin{pmatrix} 1 & 0.05 & 0 \\ 0.36 & 1 & 0.04 \\ 0.12 & 0.60 & 1 \end{pmatrix} \qquad \text{(Equation 14)}$$

the density value differences $\Delta D_C$, $\Delta D_M$, $\Delta D_Y$ are calculated. After multiplication by the respective scale factors according to Table 1 these were then entered in FIG. 9 and combined vectorially. The points A' to F' thus obtained coincide with the colorimetrically measured colour co-ordinates A to F up to mean quadratic deviations of 16° in the polar angle and 3 units ΔE CIE in the colour distance. Thus the densitometric measurement in a shadow balance control patch is sufficiently accurate to facilitate the breakdown of the deviation calculated therefrom into a grey proportion which only affects brightness and a coloured proportion which is composed of at most two chromatic separation colours and the subsequent separate restoration of these proportions by control or regulating processes. Although in the example under consideration the separation colour black is not taken into account, since it is not contained in the text area used, black can also be introduced in the general case into the overprint patch which was previously laid out in three colours. The result is a linear system of equations with four equations for four unknowns to be solved by analogy. However, in order to reduce the demands on the accuracy of the measurement of the densitometer it is recommended to provide a separate control patch for black.

EXAMPLE C

In production printing—particularly in fast—running rotary machines—it is often necessary on grounds of space to dispense completely with the printing of a print control strip or other control patches intended for photometric measurement. However, it is possible even here to carry out photometric measurements, such as for example densitometric measurements, and with the aid thereof to control or regulate the colour appearance of coloured areas according to the invention.

For this purpose measurements are made for example densitometrically on the print samples on a fixed choice of test patches in the subject itself and the mean values of the density values thus obtained are calculated for the cyan, magenta, yellow and black settings of the densitometer. (In this connection see FIG. 10). If possible those image areas 81 in which many chromatic separation colours with a percent dot area in the range between 40% and 80% (on the film or on the printing forme) occur, such as for example the three-colour mix of dark grey, brown and olive green tones, are chosen as test patches. In the event that the subject to be printed does not contain any such tones, the image areas should be chosen so that the percent dot areas averaged over these image areas lie in the aforesaid range for each separation colour. The density measurement on the fixed image areas can be carried out for example by an automatic densitometer which can be programmed to move in the X and Y directions, by measurement by hand or by so-called "on-line measurement" at at least one position over the machine width. The restriction of the measurement to specific image areas 81 can be achieved by a suitable choice of measuring positions and/or by timed measurement synchronised with the printing process. The mean density values for cyan, magenta, yellow and black obtained on the target sample are regarded as target values, possibly separated according to printing areas 83 (measuring positions over the machine width). The density value differences occurring during production are used after recalculation for control by hand or automatic regulation using the method according to the invention. The necessary determining of the density values, which would have resulted from the individual printing of the separation colours, takes place according to the same method as has already been described for the measurement on a shadow balance control field made up of three colours.

The calculation will be carried out below using the example of the print trial which forms the basis for FIG. 6 for density values which are based on averaging the results of measurements in the coloured areas 31 to 48 according to FIG. 7 which are printed with it. Because of the multiplicity of hues laid out there these coloured areas fulfil the selection criteria for the image areas to be measured.

Figure 11:
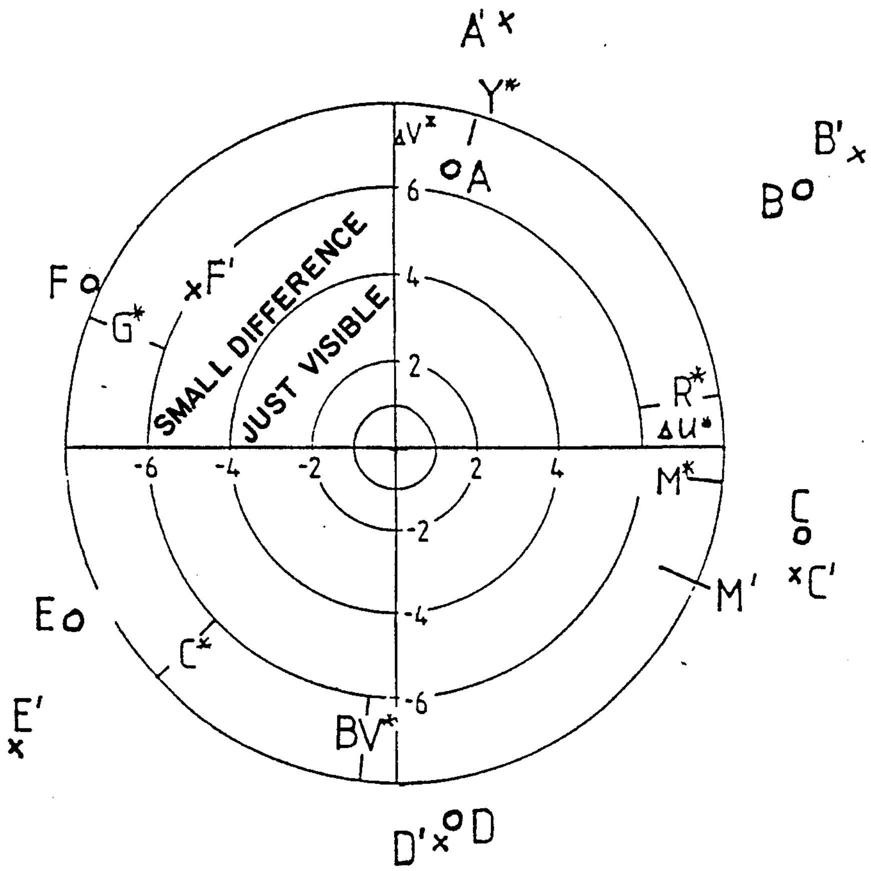
FIG. 11 illustrates the vectorial combination of separation colour vectors.

The density value differences $\Delta D'$ between the measured actual values and the target values of a target sample were recalculated as before using a linear equation system into density value differences $\Delta D$ for cyan, magenta, yellow and black which would have been produced on monochrome prints. From the mean value for the densities of cyan, magenta and yellow the following scale factors were produced according to equation (1): $0.71\times 106$ for cyan, $0.57\times 106$ for magenta and $0.55\times 106$ for yellow; these apply to the colour appearance of a shadow balance coloured area. The vectorial combination of the separation colour vectors in FIG. 11 resulted in the points A' to F' which correspond to the colorimetrically determined colour co-ordinates A to F up to the mean deviations of 6° in the polar angle and 3 units $\Delta E$ in the colour distance. The further processing of the deviations using control or regulating techniques is carried out as described above.

EXAMPLE D

Using a colour video camera, the colour filter of which is replaced by the colour filter according to DIN 26 536 which is conventionally used in densitometry, the target sample and the actual samples of the current production are scanned optically as a whole. Only the analog signals belonging to the test patches on the subject or on control patches are processed further to density values and density value differences.

In the event that control patches composed of a plurality of colours are present, the method continues as in Example B; if measurement is carried out in the subject itself the method is continued as in Example C.

If measurement is carried out in monochrome control patches, the method already described applies to such fields.

EXAMPLE E

Instead of the densitometric measurement on test patches which consist of selected image areas, measurement can also be carried out using a colorimeter. The same criteria apply here for the choice of image areas, but in addition one or more points should be chosen on the total format area of the printed sheet 51 on which the separation colour black is predominantly represented. These can be dark grey half-tone patches, so-called technical half-tone grounds in tables, text areas (black image area 82 in FIG. 10) or similar patches. However, in the latter case the field of measurement aperture of the colorimeter should have a minimum size of approximately $10\times 10$ mm since only in this way is it possible to avoid small positioning errors which have a serious effect on the result. The mean is taken separately over the chromatic image areas and the predominantly or exclusively black image areas, only the brightness co-ordinate being necessary for the latter. This results for example in the co-ordinates U*, V* and W* in the CIE-UCS-1964 system being obtained for the chromatic image areas 81 and $W_B^*$ for the predominantly black image areas 82. After formation of the differences "actual value minus target value" the brightness deviation of the black image areas which is obtained thereby, e.g. $\Delta W_B^*$ is used directly and in accordance with the prior art to control or regulate the inking of the separation colour black. The deviation of the chromatic image areas expressed by colorimetric difference values is represented according to the invention as the sum of a grey proportion which only affects brightness and a coloured proportion relating to at most two chromatic separation colours. The proportions are then balanced out or regulated separately.

The method will be demonstrated below using the example of the CIE-UCS-1964 system for a shadow balance coloured area. Let the measured colorimetric difference values be $\Delta U^*$, $\Delta V^*$ and $\Delta W_1^*$ for the chromatic image areas and $\Delta W_B^*$ for the black image areas. In order to separate off the influence of the alterations in the inking of the separation colour black on the brightness of a shadow balance coloured area, the statement $$\Delta W^* = \Delta W_1^* - k\cdot\Delta W_B^* \quad \text{(Equation 15)}$$

is made. The coefficient k depends upon the reprophotographic image synthesis. It is small when no under colour reduction and no grey component replacement (also called Unbuntaufbau, achromatic synthesis or complementary colour reduction) has taken place; k is near 1 when the image components which add up to grey in the chromatic separation colours are replaced by the separation colour black. The respective values can be determined by print trials using the relevant reproduction techniques.

Figure 12:
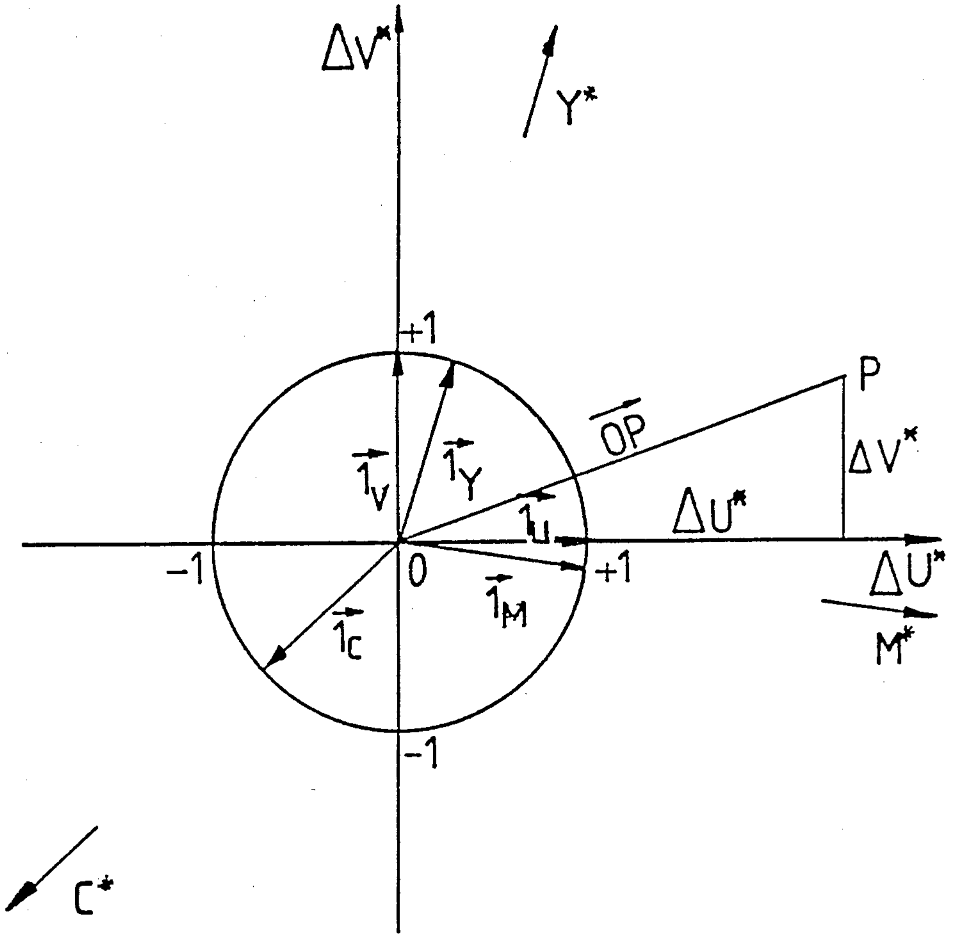
FIG. 12 illustrates the plotting of a point constructed from colorimetric difference values as well as the directions of fully saturated chromatic separation colours and unit vectors which point in these directions.

The point P which is constructed from the measured colorimetric difference values $\Delta U^*$ and $\Delta V^*$ is marked in the $\Delta U^*$-$\Delta V^*$ diagram according to FIG. 12. Also plotted in the diagram are the directions of the fully saturated chromatic separation colours, here cyan, magenta and yellow from DIN 166 539 and unit vectors $\vec{1}_C$, $\vec{1}_M$, $\vec{1}_Y$ which point in these directions. These can be represented as a linear combination of the unit vectors $\vec{1}_u$ and $\vec{1}_v$ in the directions U* and V* as follows:

$$1_C = -0.73\cdot 1_u - 0.68\cdot 1_v \quad \text{(Equation 16)}$$

$$1_M = 0.99\cdot 1_u - 0.11\cdot 1_v$$

$$1_Y = 0.26\cdot 1_u + 0.97\cdot 1_v$$

The deviation from the starting point O is expressed by the sum vector $\overrightarrow{OP}$. According to the invention this can be expressed as the sum of two proportions which are to be processed differently using regulating techniques:

$$\overrightarrow{OP} = g(\overrightarrow{1_C} + \overrightarrow{\mu 1_M} + \overrightarrow{\nu 1_Y}) + \alpha_C\cdot\overrightarrow{1_C} + \alpha_M\cdot\overrightarrow{1_M} + \alpha_Y\cdot\overrightarrow{1_Y} \quad \text{(Equation 17)}$$

where g is a number yet to be determined, and the expression in parentheses designates a linear combination of the unit vectors $\vec{1}_C$, $\vec{1}_M$ and $\vec{1}_Y$ with positive factors $\mu$ and $\nu$ which results in a zero vector.

The coefficients $a_C$, $a_M$ and $a_Y$ are chosen so that one of them is zero; the other two are then fixed.

The expression in parentheses in Equation (17) designates the grey proportion which only affects brightness; there then remains the coloured proportion made up of at most two colours. A decision can be made according to one of the criteria set out above as to which two colours are used to constitute (and balance out) the coloured proportion and which factor g is chosen. A preferred choice is one in which the fourth of the aforementioned criteria is fulfilled. In addition the alteration in brightness calculated from the two proportions thus determined should correspond to the alteration $\Delta W^*$ which remains for the chromatic image areas after deduction of the black proportion $k \cdot \Delta W_B^*$. The calculation of the alteration in brightness for the proportions requires a single print trial in which the inking of the separation colours cyan, magenta and yellow is increased individually in each case by the increments $b_C\vec{1}_C$, $b_M\vec{1}_M$ or $b_Y\vec{1}_Y$ which are to be determined colorimetrically, and reductions in the brightness by $\Delta W_C^*$, $\Delta W_M^*$ or $\Delta W_Y^*$ result from these. The alteration in brightness can now be calculated according to the formula $$\Delta W^* = -\frac{\Delta W_C}{b_C} a_C - \frac{\Delta W_M}{b_M} a_M - \frac{\Delta W_Y}{b_Y} a_Y \quad \text{(Equation 18)}$$

Figure 10:
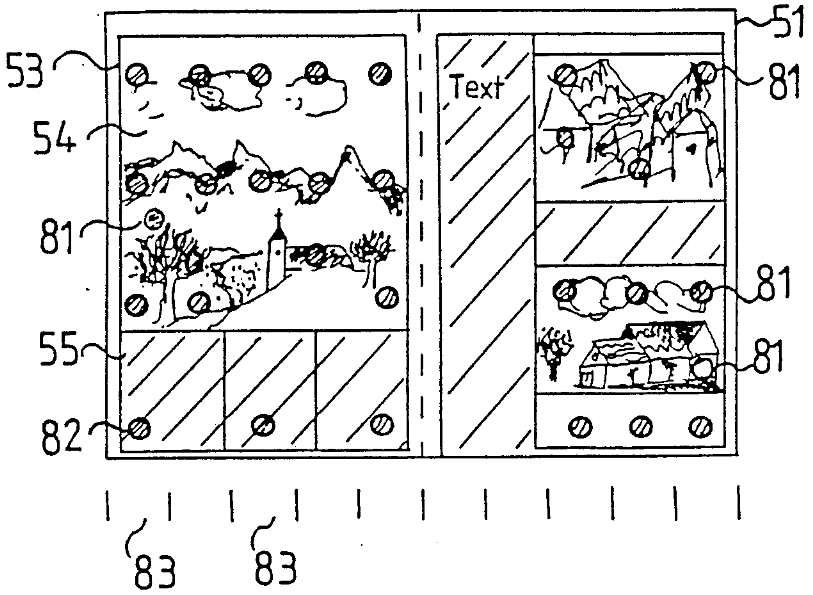
FIG. 10 illustrates the measurement on print samples of a fixed choice of test patches.

It can be seen from the same print trial which alteration of the setting for the inking of a separation colour corresponds to the appertaining unit vector in the $\Delta U^*$-$\Delta V^*$ diagram. By inversion this results in the alterations in the setting which lead to separate elimination of the deviation which is divided into two proportions. The same applies to the control or regulation of the separation colour black which is to be carried out separately. It goes without saying that the comparison of actual and target mean values of a plurality of image areas which is described above and the regulation based thereon can be carried out not only once per page of the sample but also on a plurality of image areas preferably distributed in zones over the machine width as shown in FIG. 10. Equally it will be understood that the colorimetric averaging for the chromatic separation colours can be carried out on monochrome control patches of cyan, magenta and yellow or on balance control patches and for black on black coloured control patches.

The following Examples 1 to 3 described preferred apparatus with which the method according to the invention can be advantageously carried out.

EXAMPLE 1

This relates to a densitometer which is to be positioned and operated by hand and used in particular for controlling printing processes, not only during make-ready and colour matching but also during production printing.

Figure 13:
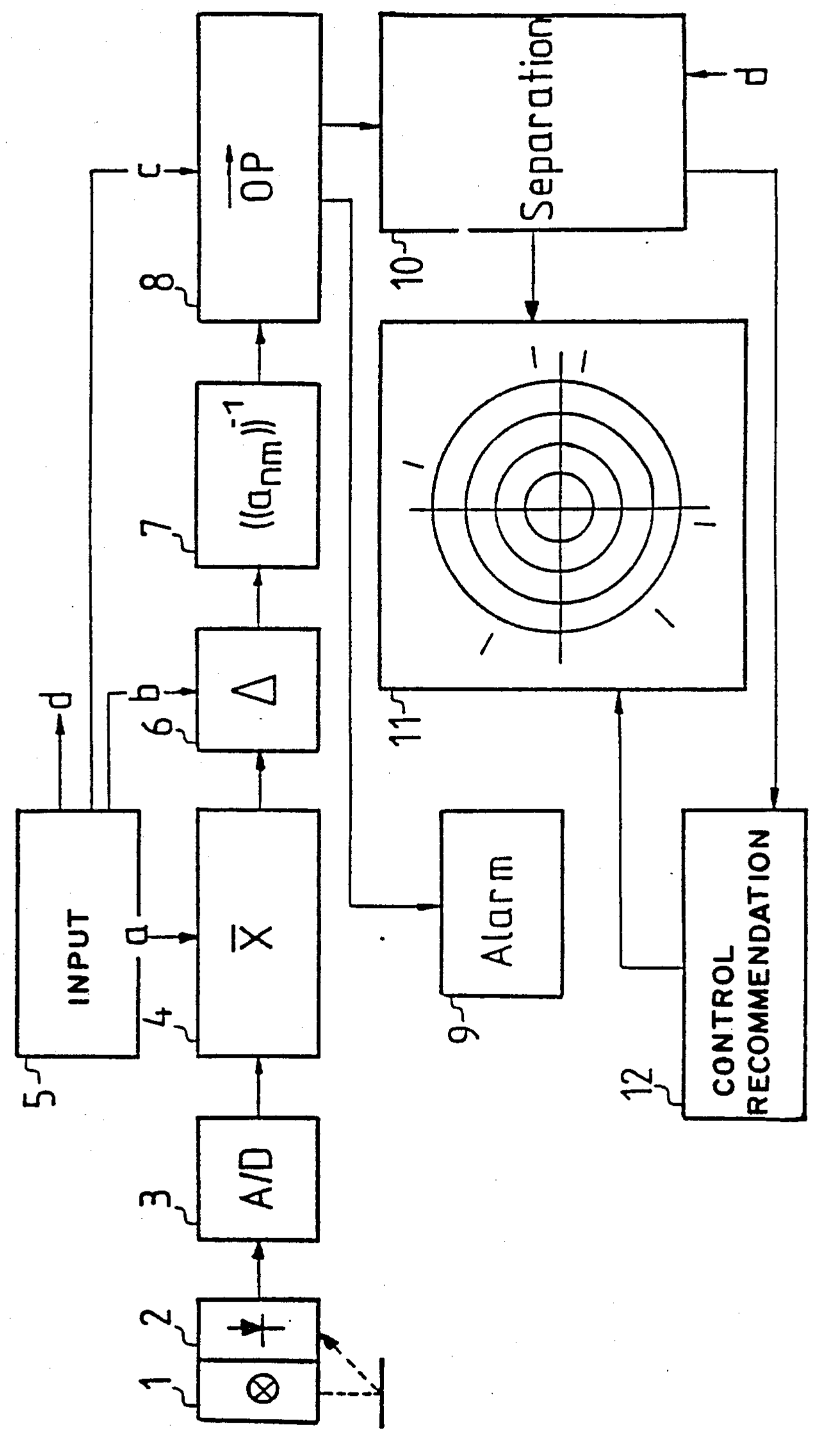
FIG. 13 shows the signal processing path of a densitometer according to the invention.

A distinction will again be made below between test patches on which the measurement is carried out, e.g. monochrome control patches or control patches laid out in a plurality of colours as balance, and a "coloured area to be influenced" in which the colour appearance is considered decisive for the usefulness of the product or as a guarantee of the correct colour rendering. The coloured area to be influenced must be known at least approximately as regards its colorimetric co-ordinates of hue and saturation as well as its percent dot areas in the chromatic separation colours. It is not necessary for it actually to be present on the subject to be printed. Thus printing can be controlled in such a way that the colour appearance of a shadow balance coloured area (not contained in the subject) would remain constant. Thus it is ensured that all coloured areas which do not lie colorimetrically too far from the grey axis (not with low brightness) remain approximately constant. The advantage in the choice of such hypothetical coloured areas to be influenced is that their parameters can be easily seen from a colour atlas, whilst the colorimetric co-ordinates and percent dot areas of coloured areas in the subject are generally not sufficiently accurately known. FIG. 13 shows the signal processing path of such a densitometer according to the invention; the mechanical, optical and other electronic components are not shown. The light from the light source 1 which is reflected by the test patch of the target or actual sample is detected in the sensor 2. The signal which is initially present in analog form is brought into digital form, preferably 16 bit technology, in an analog/digital converter 3, and converted in unit 4 to actual values. The mean is also taken here, if the corresponding input instruction a from unit 5 is present. The density values b located in the target value store in unit 5 are either fed in by the user or stored from a target sample; they are subtracted from the actual values in unit 6. If the measurements did not take place on monochrome image areas or control patches, the matrix calculation of the individual colour densities is carried out in unit 7 from the total colour densities.

The sum vector $\vec{OP}$ is calculated in unit 8 if the input data c "Target values of the saturated chromatic separation colours" and "Target colour co-ordinates and percent dot area of the coloured area to be controlled" are present from unit 5. The sum vector $\vec{OP}$ which is not broken down and preferably also the separation colour vectors, e.g. $\vec{C}$, $\vec{M}$, $\vec{Y}$, are represented in an output unit 11 graphically (preferably in colour) on a screen or on an X-Y recorder, e.g. as shown in FIGS. 3 and 5. In addition the numeric or verbal output of the density value differences of the separation colours can be made, e.g. cyan, magenta, yellow, black, the absolute amount of the sum vector, e.g. in units ΔE CIE-UCS-1964, and the hue of the shift (colour cast), e.g. reddish, greenish, yellow-reddish or as a polar angle. The operator can be warned by the boundary value indicator as soon as the amount of the sum vector $\vec{OP}$ exceeds a fixed value or the polar angle is located in a range which is to be regarded as critical, e.g. green cast in the printing of skin tones.

By feeding in different target colour co-ordinates and different percent dot areas for the coloured area to be influenced in unit 5 the operator can also orient himself by magnitude and direction of the deviation for this coloured area. The calculation of the grey proportion which only affects brightness and the coloured proportion which relates at most to two chromatic separation colours takes place in unit 10 if the input data d are available there from unit 5 regarding the separation colours of the coloured proportion or one of the aforementioned criteria for choice. The output of the control recommendation in density value units, or already converted into the respective setting (e.g. ink key position, ductor position), is carried out by unit 12 while the values for the chromatic separation colours and black are are sent as output data separately according to "colour cast" and "brightness". This can be achieved in alphanumeric or graphic form on the output unit 11.

The operator carries out the control corrections recommended to him in the sequence which seems favourable to him. If only densitometric control corrections are sent as output data he has to carry out the conversion to values of the appertaining setting for the inking on the basis of experience. The success of the correction which he carries out is checked on a further actual sample which is taken, resulting in new control recommendations, etc.

EXAMPLE 2

This relates to apparatus for regulating the colour appearance of printing or similar products after adjustment of the inking of the separation colours on the basis of measurements of the degree of reflectance of test patches on the products.

Figure 14:
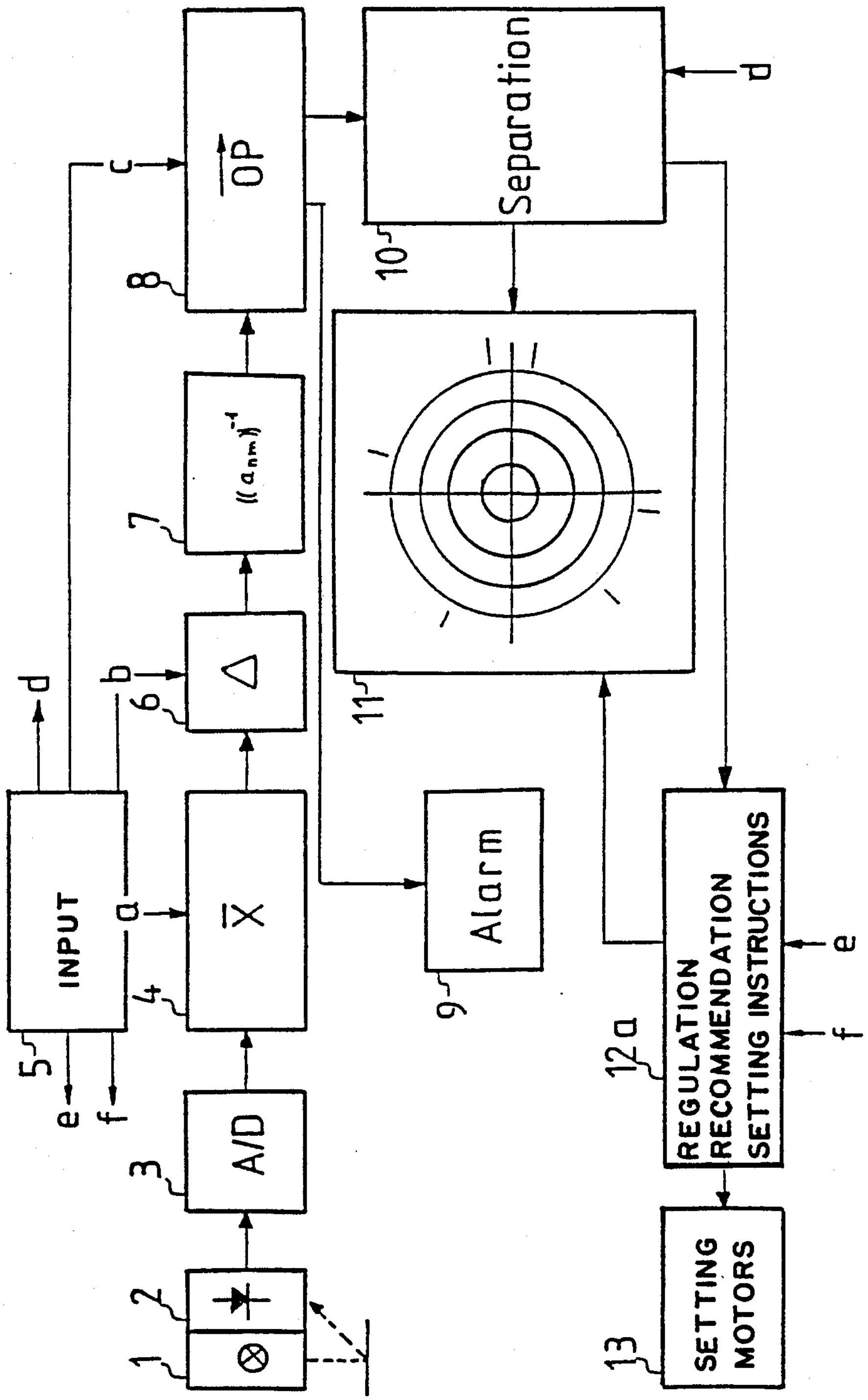
FIG. 14 shows the apparatus, according to the model of FIG. 13, in the form of a signal flow diagram.

The apparatus is shown in FIG. 14 according to the model of FIG. 13 in the form of a signal flow diagram. The mechanical, optical and other electronic components are not shown. The signal path up to and including the analog/digital converter 3 is as described in Example 1. The signals measured either on-line in the production machine or off-line on an actual sample are converted in unit 4 into actual values for the density; if there is an appropriate instruction c from unit 5, mean values are formed for the density values of a plurality of test patches, e.g. image areas, or successive actual samples measured on-line. In printing processes with zoned adjustment of the inking over the machine width the appertaining density values or their mean values are preferably calculated in each colour zone and finally after evaluation are converted into setting instructions.

The description of units 6 and 7 is as in Example 1. The approximate colorimetric deviations are calculated in unit 8 according to the inputs c from unit 5, and the coloured area to be influenced in each case can be fed in here. As in FIG. 13 the sum vector $\overrightarrow{OP}$ and its separation colour vectors is shown numerically and/or graphically in an output unit 11, possibly separately for each colour zone and different coloured areas to be influenced. A boundary value indicator 9 is also provided which gives a warning when predetermined limits for the amount or direction of the deviation are exceeded. In unit 10 the total deviation is broken down according to the invention into two proportions according to the criteria input d from unit 5. From this regulation recommendations are calculated in unit 12*a* for the control members for the inking (e.g. ink key setting, ductor stroke), and if required different regulating factors for the grey proportion and the coloured proportion as well as for the separation colour black, different for each zone if required, can be fed in via the input e from unit 5. What is meant here by regulating factor is the conversion factor between deviation and setting correction. Regulation in which the regulating factor of the coloured proportion is chosen so that it is larger than that of the grey proportion is preferred in terms of the invention.

After the operator has cleared the regulation recommendation through the input f from unit 5 the setting instructions are passed to the setting motors 13 of the ink fountain. The success of the setting operation is checked densitometrically on an actual sample which is taken later, resulting if necessary in a further regulating process etc.

Figure 15:
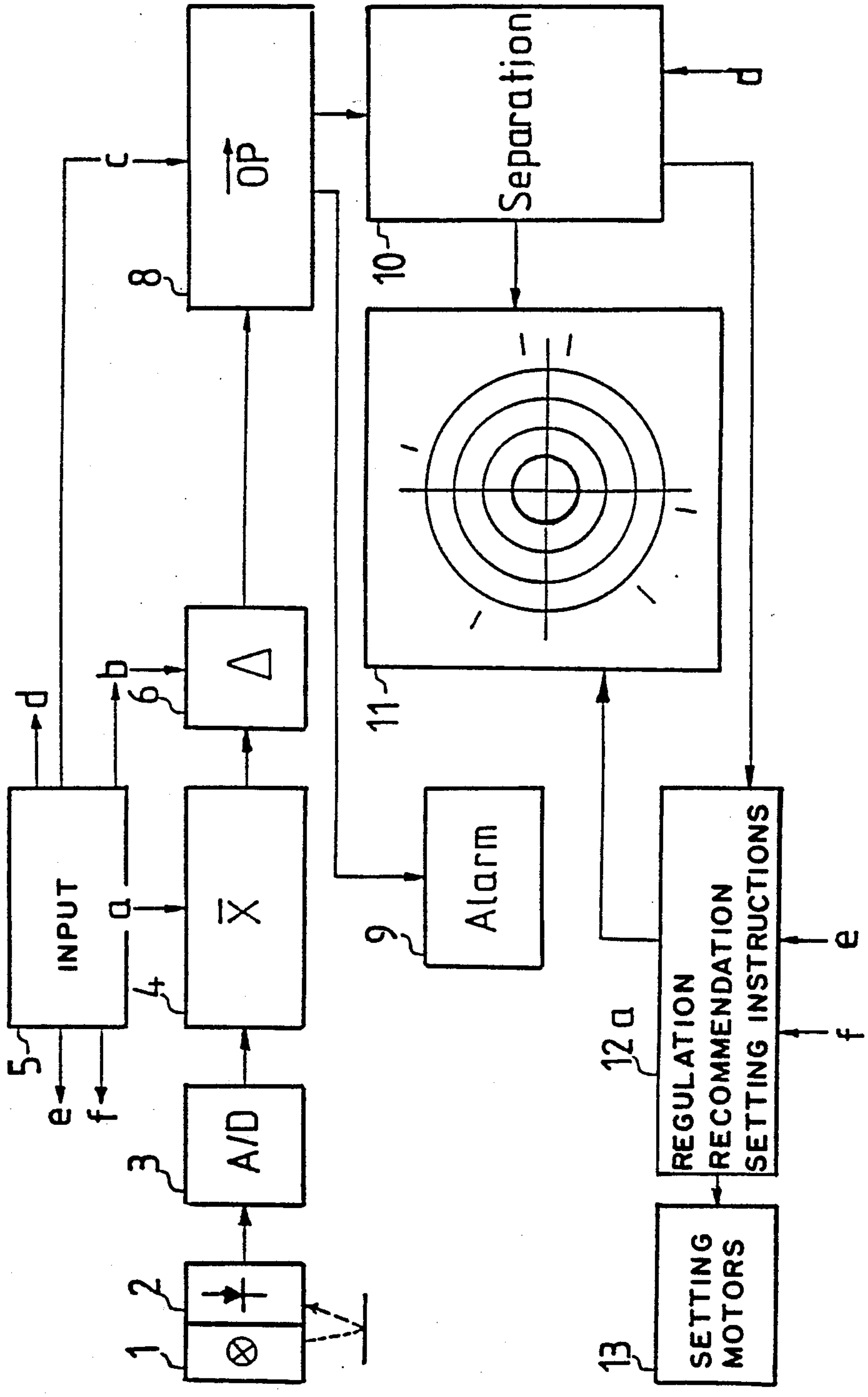
FIG. 15 illustrates the basic system of FIG. 14, with alterations.

Whilst the apparatus previously described under Example 2 makes it possible to regulate the colour appearance of the coloured area to be influenced by means of densitometric measurement, it can also be immediately inferred from the description how a similarly operating apparatus can be constructed which serves for colorimetry. The colorimetric measurement can be advantageously carried out on multi-coloured control patches and in particular on balance control patches or also directly on one or more chromatic image areas serving as test patches and separately on black image areas, over which an average is then to be taken. The basic layout of the signal flow plan according to FIG. 14 is retained and the few alterations are marked in FIG. 15. The colorimetric co-ordinates are calculated from the measured signals in unit 4, the colorimetric difference values are formed in unit 6. Unit 8 calculates the data for alphanumeric and/or graphic output on the output unit 11, if the colour co-ordinates of the fully saturated separation colours and the target colour co-ordinates of the coloured area to be influenced are fed in via the input c from unit 5. The correction of the brightness value determined on chromatic image areas is also carried out in unit 8 with the alteration which was determined on the black image areas. Accordingly the output unit 11 displays not only the amount and direction of the sum vector $\overrightarrow{OP}$ but also the alterations in the brightness of the chromatic image areas and the image areas serving for control of the separation colour black. The breakdown of the sum vector $\overrightarrow{OP}$ into proportions which has already been described takes place in unit 10, the operator predetermining the criteria for the choice of the two separation colours of the coloured proportion and for the alteration in the brightness via the input d from unit 5. The rest of the method using regulating techniques continues as described for FIG. 14.

EXAMPLE 3

This relates to a film sheet (or a plurality of film sheets) which consists of a series of copies for control patches which after assembly as required and subsequent copying onto the appertaining printing formes of the separation colours in the printing process produce a so-called print control strip consisting of control patch illustrations of different separation colours. This print control strip is preferably so constructed that in each print zone, i.e. every 30 to 40 mm, there is a shadow balance control patch which has percent dot areas graded according to a reprophotographic grey specification appropriate for usual printing conditions on the copy. Examples are C 72, M 57, Y 55 or C 75, M 62, Y 60 for positive copies in offset printing on art paper. There should also be solid tone patches of the separation colours as well as overprints thereof and half-tone patches for the separation colour black in three-quarter tone.

FIGS. 16*a* and 16*b* show two preferred examples from which the choice and arrangement of the control patches can be seen. They show the print control strips which are produced at the same time by the apparatus according to the above definition.

In the arrangement according to FIG. 16*a* there is a control patch 21 of $5\times5$ mm$^2$ constructed as a shadow balance in each zone, here assumed to be 30 mm, and in every second zone there is a further control patch 22 constructed as a middle-tone balance. By means of the latter the image rendering in the middle-tone range can be influenced particularly well. As well as 21 in every second zone there is a half-tone patch 23 for black with 80% dot area. The latter makes the inking of black controllable, and the measurement of the inking of the chromatic separation colours takes place in the control patches 21 and 22.

In addition there are solid tone patches 24 for the basic separation colours, here C, M and Y and black B as well as for two special separation colours X and Z. Microline patches or highlight dot patches serve as the copy control patch 25 and line screen patch pairs 26 are provided to determine the printing defects of "slur" and "doubling".

In the arrangement according to FIG. 16*b* there is a control patch 21 and 22 in each zone, here also assumed to be 30 mm. As well as these there are also half-tone patches 23 with 80% dot area for all four separation colours in every second zone. In addition solid tone patches 24, copy control patches 25 and line screen patch pairs 26 for all separation colours are provided; they are repeated approximately every 9 zones.

The arrangements and the choice of control patches shown in FIGS. 16*a* and 16*b* can of course be varied, complemented or have their repeat period changed, so long as a half-tone control patch composed of the chromatic basic separation colours can be measured in each zone and a half-tone or solid tone patch for black can also be measured in every second or third zone.

The different forms of apparatus described above are suitable not only for screen printing but also for those printing processes which work with screened copies. The apparatus according to Example 3 could also serve for completely screenless methods if 21, 22, 23, 24 are constructed as half-tone patches on condition that instead of the value for the percent dot area the mathematical value given in Equation (12) is used.

It will be evident that this invention is not limited to the specific embodiments described, but that modifications can be made without departing from the scope of the present invention as set forth in the appended claims.

What is claimed is:

1. In a method for influencing the colour appearance of a coloured area made up of at least three chromatic separation colours in a printing process, on the basis of densitometric measurements in at least one test area in which density value differences between the densitometric actual values and predetermined target values are determined for the separation colours and are used to influence the inking of the separation colours, the improvement comprising inking the chromatic separation colours in at most two chromatic separation colours as a function of the coloured proportion of a sum vector, determining said sum vector starting from the density value differences of the chromatic separation colours and based on a coloured area which is to be influenced as regards its colour appearance in an equidistantly graded colour space, and breaking down the colour shift indicated by said sum vector into a grey proportion which only affects brightness as well as a coloured proportion relating to at most two chromatic separation colours, said sum vector being formed by addition of separation colour vectors associated with the chromatic separation colours, the absolute amount and direction thereof being determined by means of at least one test run so that the sum vector in a plane of equal brightness corresponds substantially to the vector which points from the colour coordinates of the coloured area appertaining to the target values to the colour coordinates of the coloured area appertaining to the actual values, said absolute amount of the separation colour vectors being determined as the product (a) of the percent dot area of the respective separation colour in the coloured area to be influenced and (b) a calibration factor (f) which is determined by approximation as $$f = 80 \times D - 1.1$$

where D is the mean of the target colour densities of the chromatic separation colours measured in the test areas.

2. The method according to claim 1 characterised in that the direction of the separation colour vectors corresponds in each case substantially to the direction which points from the colour coordinates of the coloured area appertaining to the target values to the colour coordinates of the appertaining fully saturated separation colour.

3. The method according to claim 1 characterised in that the sum vector is broken down into the grey proportion and the coloured proportion in such manner that the sum of the absolute amounts of the separation colour components of the coloured proportion appertaining to the two chromatic separation colours is minimal.

4. The method according to claim 1, characterised in that the sum vector is broken down into the grey proportion and the coloured proportion in such manner that the sum of the absolute amounts of the separation colour components of the coloured proportion and the grey proportion is minimal.

5. The method according to claim 1 characterised in that the sum vector is broken down into the grey proportion and the coloured proportion in such manner that the difference in brightness associated with the grey proportion is minimal.

6. The method according to claim 1 characterised in that the sum vector is broken down into the grey proportion and the coloured proportion in such manner that the coloured proportion is expressed by the two separation colour vectors the positive and negative directions of which enclose and flank the sum vector.

7. The method according to claim 1 characterised in that the test areas are formed by control patches which in each case contain only one single chromatic separation colour.

8. The method according to claim 1 characterised in that the test areas are formed by control patches which in each case contain a plurality of chromatic separation colours.

9. The method according to claim 8 characterised in that the control patches are constructed as balance control patches, and the percent dot areas of the chromatic separation colours are graded to produce a neutral grey colour appearance.

10. The method according to claim 1 characterised by providing as test areas control patches which contain three chromatic separation colours and control patches which predominantly contain black.

11. The method according to claim 10 characterized in that the control patches are constructed as balance control patches, and the percent dot areas of the chromatic separation colours are graded to produce a neutral grey colour appearance.

12. The method according to claim 1 characterised in that the test area is formed by a part of the subject to be printed.

13. The method according to claim 12 characterised by making measurements in a plurality of test areas and averaging the values thereby obtained.

14. The method according to claim 13 wherein the inking can be influenced in zones over the format, characterised in that in each case the measurement values for the test areas located in a zone are averaged.

* * * * *

UNITED STATES PATENT AND TRADEMARK OFFICE

CERTIFICATE OF CORRECTION

PATENT NO. : 4,901,254

DATED : February 13, 1990

INVENTOR(S) : Friedrich Dolezalek and Karl-Heinz Besson

It is certified that error appears in the above-identified patent and that said Letters Patent is hereby corrected as shown below:

Column 3, line 7, change "corrdespond-" to -- correspond --.

Column 3, line 27, change "knwon" to -- known --.

Column 5, line 49, change "additon" to -- addition --.

Column 5, line 56, change "composes" to -- composed --.

Column 6, line 19, change "our" to -- out --.

Column 6, line 62, change "ivention" to -- invention --.

Column 7, line 14, after "black" insert -- test --.

Column 8, line 15, change "for" to -- far --.

Column 9, line 44, change "si" to -- is --.

Column 10, line 1, change "$\Delta Dc$," to -- $\Delta D_c$', --.

Column 11, line 29, change "toi" to -- to --.

Column 11, line 62, change "contraray" to -- contrary --.

Column 12, line 10, change "process" to -- processes --.

UNITED STATES PATENT AND TRADEMARK OFFICE

CERTIFICATE OF CORRECTION

PATENT NO. : 4,901,254

DATED : February 13, 1990

INVENTOR(S) : Friedrich Dolezalek and Karl-Heinz Besson

It is certified that error appears in the above-identified patent and that said Letters Patent is hereby corrected as shown below:

Column 12, line 65, change "though" to -- thought --.

Signed and Sealed this

First Day of October, 1991

*Attest:*

HARRY F. MANBECK, JR.

*Attesting Officer*

*Commissioner of Patents and Trademarks*